United States Statutory Invention Registration [19]

[11] Reg. Number: H793

Zangrando [43] Published: Jul. 3, 1990

[54] ROBOTIC AUTOLOADER

[75] Inventor: Roy A. Zangrando, Boonton, N.J.

[73] Assignee: The United States of America as represented by the Secretary of the Army, Washington, D.C.

[21] Appl. No.: 421,430

[22] Filed: Oct. 12, 1989

[51] Int. Cl.[5] ..... F41F 9/10

[52] U.S. Cl. ..... 89/46; 89/47

*Primary Examiner*—Charles T. Jordan
*Assistant Examiner*—Michael J. Carone
*Attorney, Agent, or Firm*—Anthony T. Lane; Edward Goldberg; Robert Gibson

[57] ABSTRACT

An autoloader for loading ammunition from plural cavities of a magazine to a breech of a gun, comprises a base having a pair of jointed links pivotally connected thereto. Actuators are connected to the links for pivoting the links from a low storage position near the magazine to an extended loading position near the breech. A loading head is fixed to the end of the links and carries a slidably mounted carriage assembly. A gripper assembly is connected to the end of the carriage assembly for receiving and gripping the flange of a round so that it can be extracted from a cavity of the magazine. With movement of the carriage assembly, the round is pulled onto the load head and guided by a guide tube fixed to the load head. The jointed links are then moved to bring the load head near the breech whereupon the carriage assembly is slid forwardly to introduce the round into the breech. Near the end of the load head which is closest to the breech, cams are provided for interacting with the gripper assembly to release the assembly's grip on the round so that the round is free to remain in the breech. The round can also be reengaged by the gripper assembly by moving the carriage assembly toward the round, whereby the round can be extracted from the breech and returned to the cavity of the magazine.

9 Claims, 5 Drawing Sheets

A statutory invention registration is not a patent. It has the defensive attributes of a patent but does not have the enforceable attributes of a patent. No article or advertisement or the like may use the term patent, or any term suggestive of a patent, when referring to a statutory invention registration. For more specific information on the rights associated with a statutory invention registration see 35 U.S.C. 157.

ROBOTIC AUTOLOADER

GOVERNMENTAL INTEREST

The invention described herein may be manufactured, used and licensed by or for the Government for Governmental purposes without payment to me/us of any royalties.

FIELD AND BACKGROUND OF THE INVENTION

The present invention relates in general to ordinance loading devices for guns, and in particular to a new and useful robotic autoloader.

Self propelled gun systems are currently manned by several personnel, one of whose duty is to manually load ammunition into the gun. Machines which perform this function have been devised to reduce personnel requirements, and also for use in future unmanned systems. Most are of the hard automation type taylored to a specific system. They are complex, and further requires that each round of ammunition be individually stocked into the storage magazine.

SUMMARY OF THE INVENTION

A robotic type autoloader has been devised according to the present invention which is simple, adaptable to varied applications, and which permits the ammunition to be stocked in bulk within a magazine.

The present invention relates to a robotic ammunition loader which is suitable for use on large caliber gun systems. A robotic arm transports a load head in line with a particular round of ammunition within a magazine whereupon a gripper extends from the load head, grips the base of the round, and withdraws it into the load head. The robotic arm then transports the load head together with the round to a position in line with the gun at its breech, whereupon the load head pushes the round into the gun chamber, and the robotic arm returns to a home position away from the recoil zone of the gun. Similarly, the round can be removed from the gun and returned to the magazine.

Accordingly, it is an object of the invention to provide a robotic autoloader to load and extract ammunition for large caliber guns.

Another object of the invention is to provide an autoloader which will select and remove any round from a fixed magazine thereby permitting ammunition to be bulk loaded to the gun system by installing fully loaded magazines having a mix of ammo types.

Another object of the invention is to provide a robotic type of device capable of reprogramming to adapt to the varying relative locations of the gun and magazine in different gun systems.

Another object of the invention is to provide a simple device for ease of maintenance and repair.

According to one embodiment of the invention, there is provided an autoloader comprised of a jointed link having a second joint to a base fixed to the gun chassis, each joint having a single degree of freedom with its axis parallel to the axis of the gun, and having independent actuating means. The extremity of the link is provided with a gripper device moveable through a guide tube along an axis parallel to the axis of the link, said gripper having means to grip the base of a round, and release it according to biasing cams adjacent the path of travel. A plurality of ammunition magazines, each having a multiplicity of cavities, provide means to supply and store ammunition adjacent the gun, said ammunition being positioned axially parallel to the axes of both the link and the gun.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which a preferred embodiment of the invention is illustrated.

DESCRIPTION OF THE PREFERRED EMBODIMENTS

Figure 1:
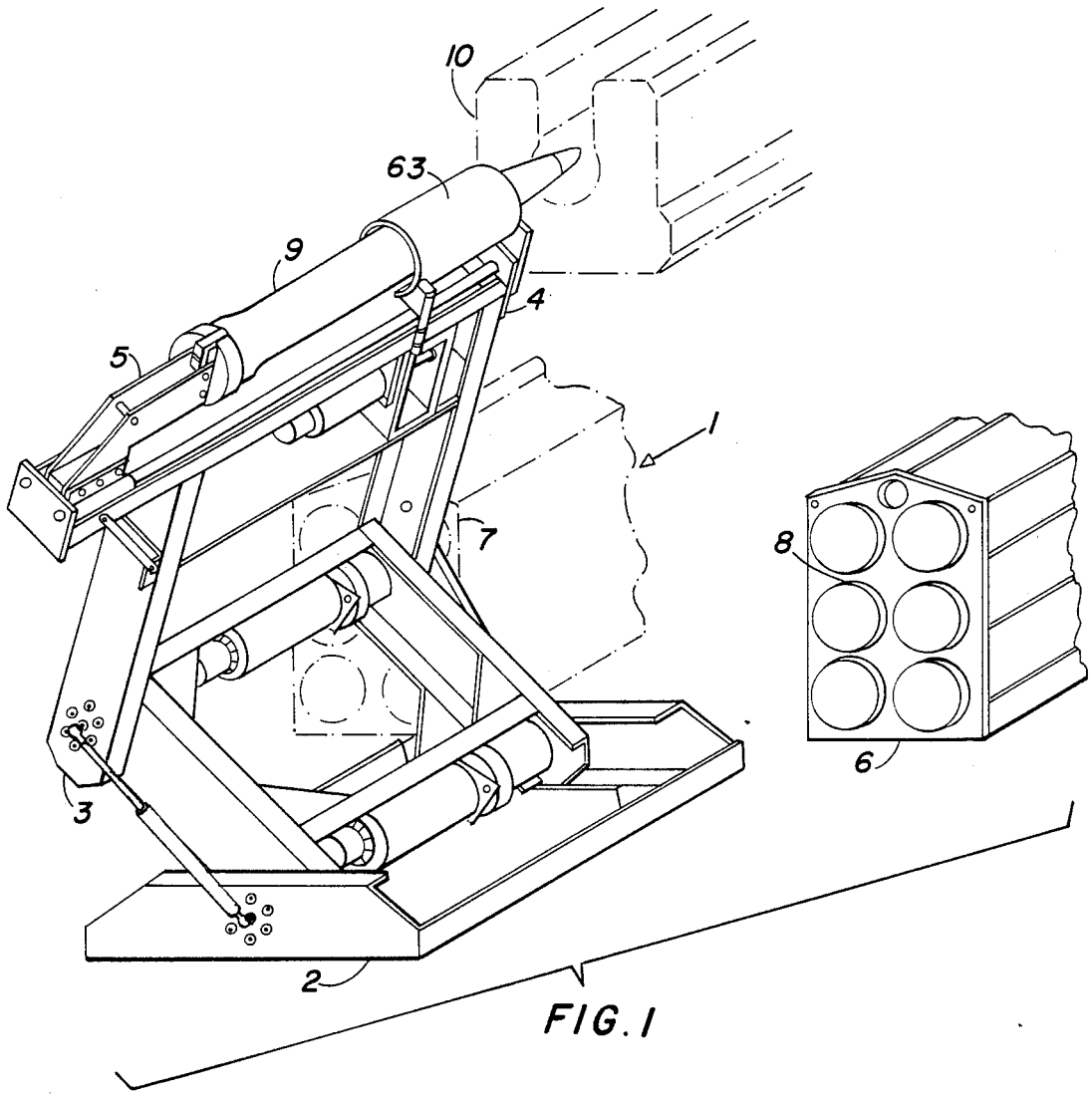
FIG. 1 is a perspective view of a robotic autoloader according to an embodiment of the invention, shown at the gun loading position.

Referring to FIG. 1, there is shown generally at 1, a robotic autoloader according to an embodiment of the invention. Robotic autoloader 1 includes a base 2 which may be installed on the chassis or turret of a gun system. A jointed link 3, attached to, and moveable in relation to base 2, carries a load head 4, having a moveable carriage assembly 5. Ammunition magazines 6 and 7, each having a plurality of cavities 8 to store rounds of ammunition, are installed in the gun system. In operation, the moveable link 3 transports the load head 4, from an initial home position, to a select cavity 8 of the magazine 6. Carriage assembly 5 extends to cavity 8, and withdraws round 9. Link 3 then transports load head 4 together with round 9 to the gun breech 10, loads said round 9 into the gun, and link 3 returns to the home position.

Figure 2:
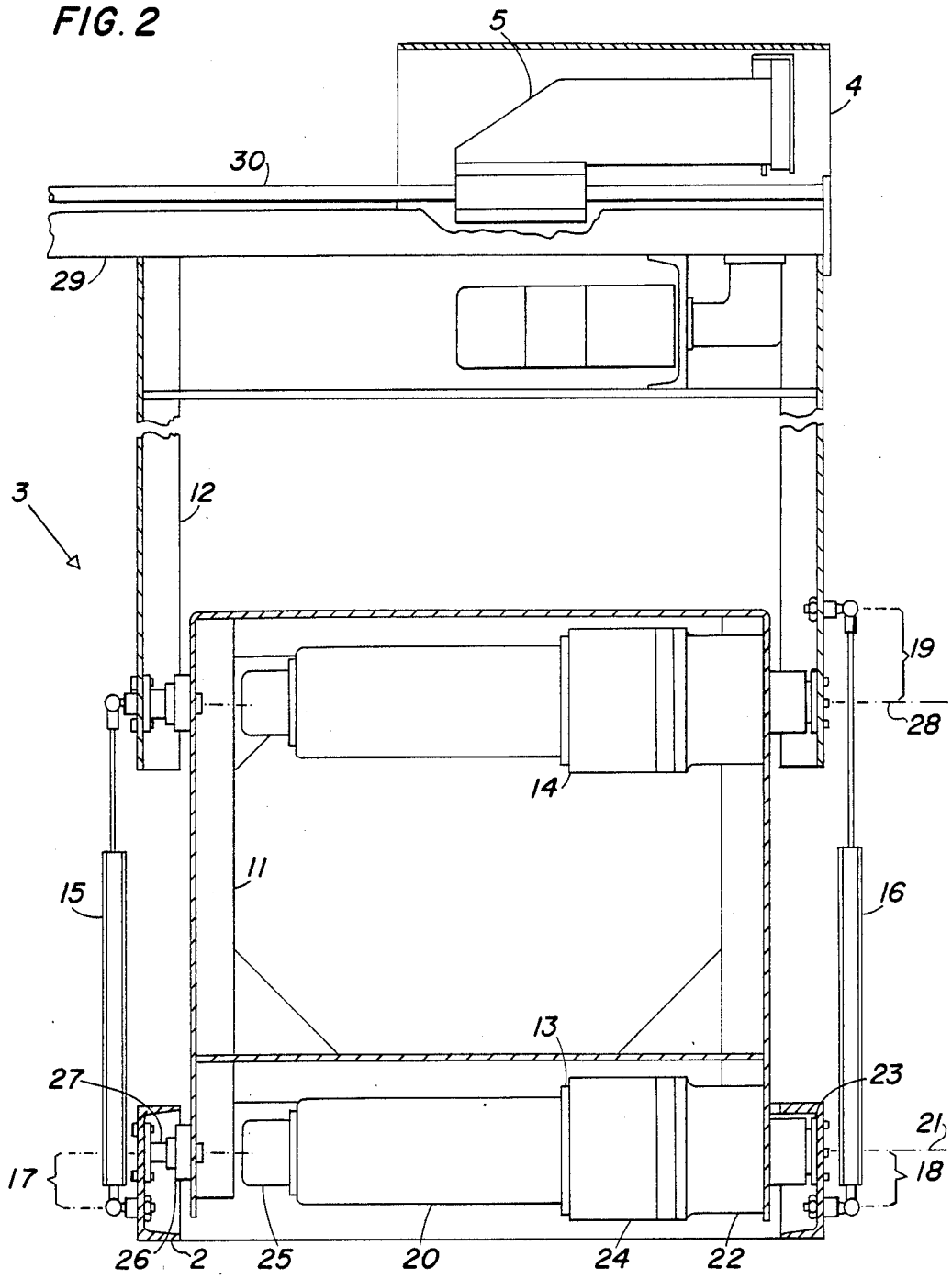
FIG. 2 is a side view, partially cut away, showing the robotic autoloader in the fully erect position.

Referring now to FIG. 2, link 3 is comprised of a lower link 11, and an upper link 12. Actuators 13 and 14 position lower link 11 with respect to base 2, and upper link 12 with respect to lower link 11. Equilibrators 15 and 16 counterbalance the loads on the actuators 13 and 14, the equilibrators being comprised of gas spring assemblies. Equilibrator 15 counterbalances the load on actuator 13 by virtue of the mounting offset 17 with base 2. Similarly, equilibrator 16 counterbalances the load on both actuators 13 and 14 by virtue of the offset 18 with base 2, and the offset 19 with upper link 12 respectively.

Actuator 13, fixed to link 11, is comprised of a servomotor 20, which drives link 11 about axis 21 thru a gear train 22, typically having a 100:1 reduction ratio, with output hub 23 fixed to base 2. A failsafe brake 24 inhibits motion of the actuator induced by the load in the event of a power failure or when intentionally applied to enhance stability. A resolver 25 provides motor position feedback to the control system to determine the position of actuator 13, which in turn establishes the relationship of link 11 to the base 2. A bearing 26 fixed to link 11, rotatable about idler shaft 27, fixed to base 2, provides support for link 11. Similarly, actuator 14, also fixed to link 11, drives link 12 about axis 28. A detailed description of the actuator embodiments follows.

Figure 3:
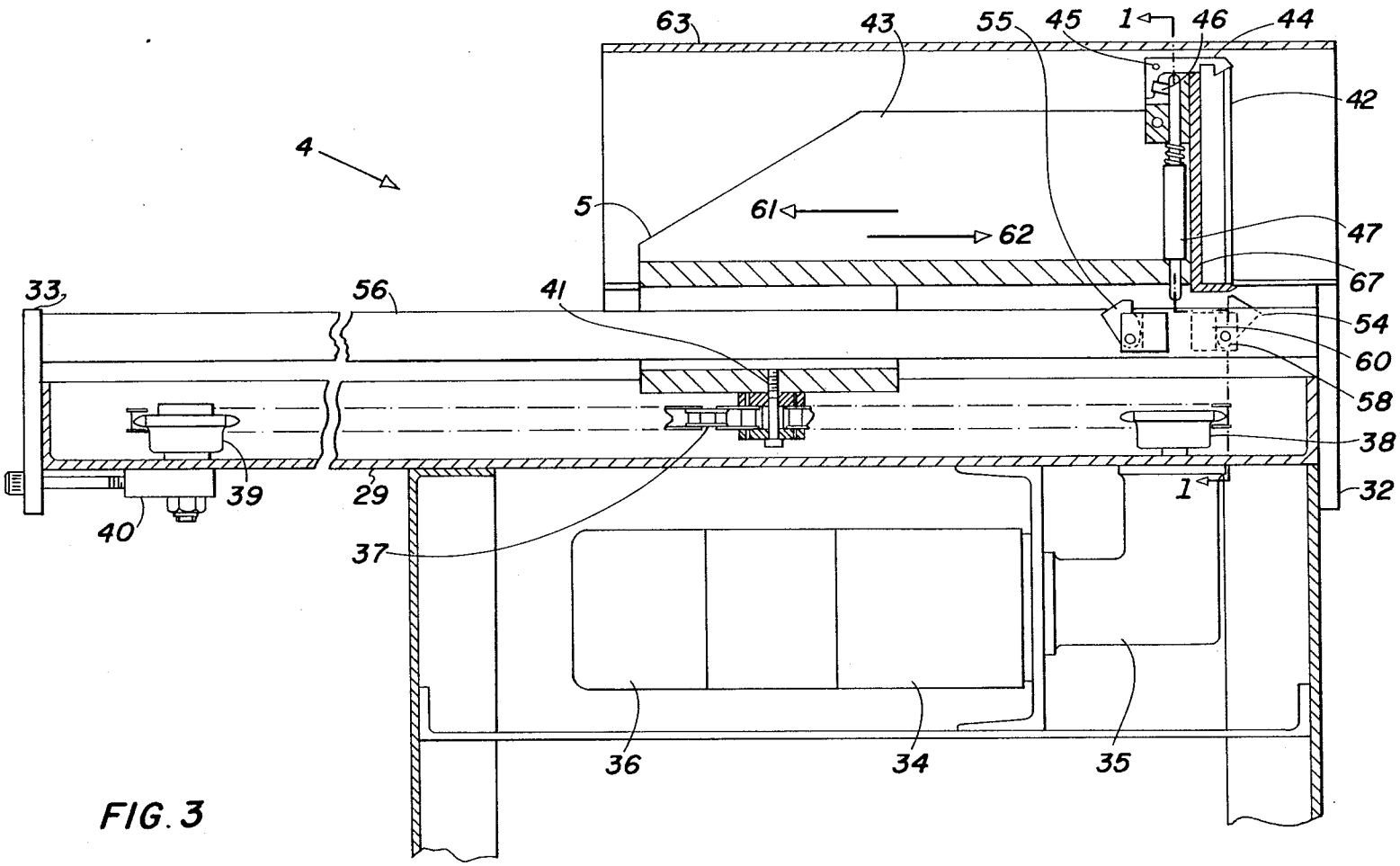
FIG. 3 is a partial view, partially cut away, showing the load head and its elements.
Figure 4:
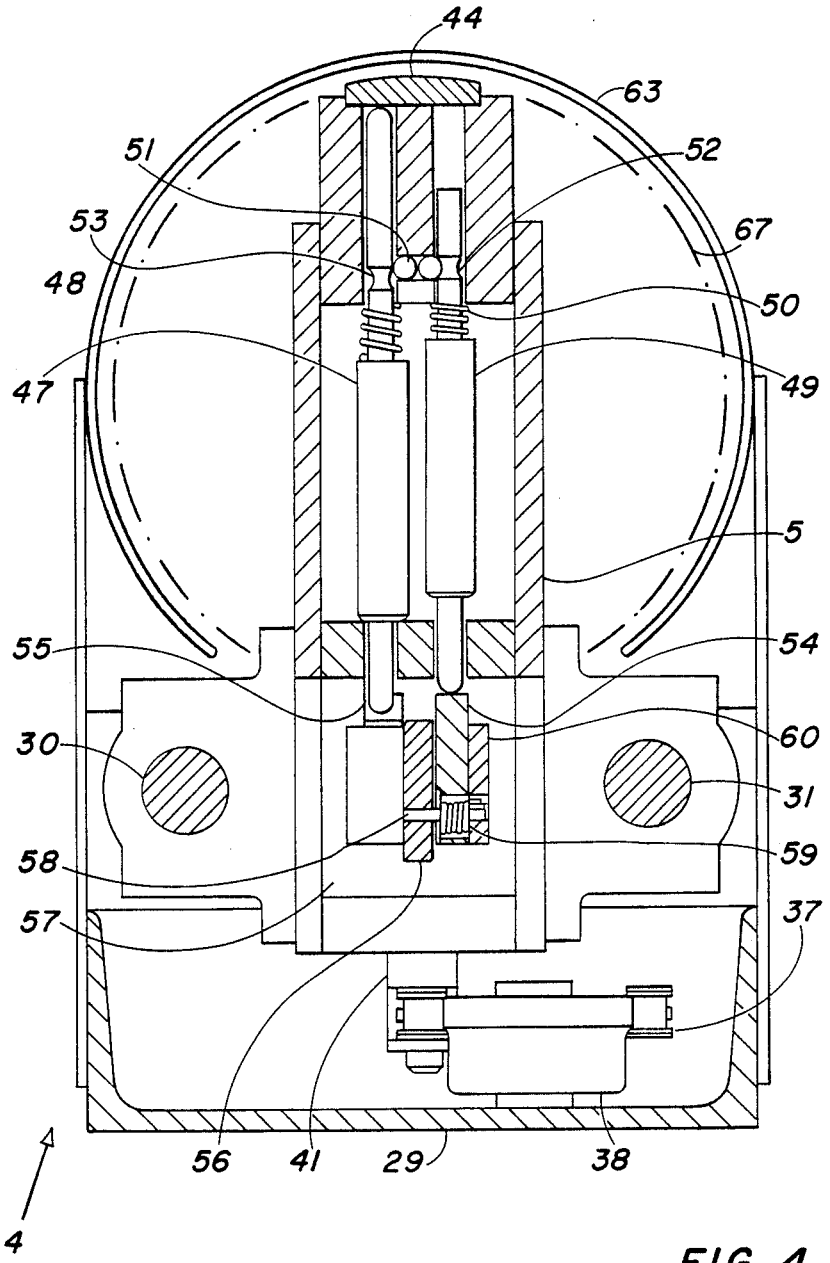
FIG. 4 is an axial cross section of the load head taken along line 1—1 of FIG. 3.

Referring now to FIGS. 2, 3, and 4, a load head 4, attached to upper arm 12, is comprised of a chassis 29, and a carriage assembly 5 moveable along parallel shafts 30 and 31, these shafts being supported at each end by end plates 32 and 33 attached to chassis 29. A servomotor 34 with right angle gear box 35, and resolver 36, controls the motion and position of carriage assembly 5 along shafts 30 and 31, via drive chain 37 suspended between drive sprocket 38 on the output shaft of gear box 35, and idler sprocket 39 attached to a tension adjusting block 40, on chassis 29, the chain 37 being fixed to carriage assembly 5 at point 41.

Figure 6:
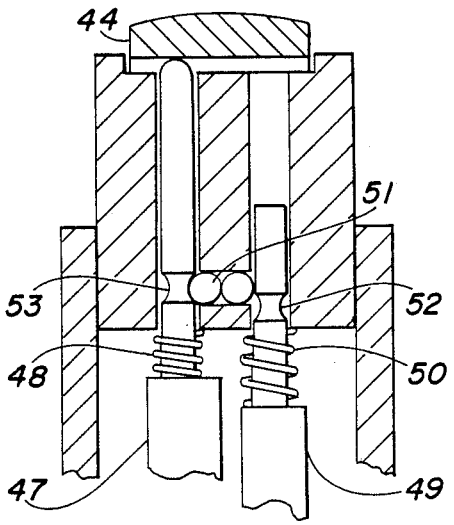
FIG. 6 is a partial axial cross section of the load head, showing the gripper latching components in the unlatched position.

Referring now to FIGS. 3, 4, and 6, a gripper assembly 42, mounted on the end of gripper arm 43 of carriage assembly 5, is comprised of a grip cup 67, with a latch 44 pivoting on pin 45, and biased to the latched position as shown in FIGS. 3 and 4, by spring 46. An unlatch push rod 47, when urged upwardly against spring 48, lifts latch 44 whereupon a locking push rod 49 biased downwardly by spring 50, urges balls 51 out of groove 52 in said push rod 49, and into groove 53 of unlatched push rod 47, thus locking push rod 47 in the upward position, which in turn holds latch 44 in the raised or unlatched position, as shown in FIG. 6. Similarly, when locking push rod 49 is urged upwardly, balls 51 are urged out of groove 53 in push rod 47, and into groove 52 of push rod 49, thereby releasing latch 44 to the latched position, and locking push rod 49 in the raised position as shown in FIG. 4.

Referring now to FIGS. 3 and 4, cams 54 and 55 are attached to opposite sides of rail 56, which is in turn suspended between end plates 32 and 33 of load head 4, and passes through cavity 57 of carriage assembly 5. Cam 54 is rotatable about pin 58, and is biased to the position shown, by spring 59, being restrained from further movement, by a step in block 60. Cam 55 functions similarly, but opposite in direction to that of cam 54. Cam 55 is positioned to interact with push rod 47 according to the motion of carriage 5. More specifically, movement of the carriage assembly 5 in the rearward direction, shown by arrow 61, from the position shown in FIG. 3, causes the push rod 47 to push cam 55 out of the path of travel of said push rod 47, whereupon the cam 55 is returned to its former position by a spring similar to spring 59, having had no effect on push rod 47. Movement of the carriage assembly 5 in the forward direction 62, that is, returning toward the position shown in FIG. 3, causes the push rod 47 to ride up the sloping surface of cam 55, thereby actuating said push rod 47, and unlatching the gripper assembly 42 as heretofore described. Similarly, and upon further movement in direction 62, push rod 49, displaces cam 54. Upon returning in the direction 61, push rod 49 is actuated by said cam 54, thereby relatching the gripper assembly 42. Thus there is means to latch or unlatch the gripper assembly 42, by virtue of the starting position and direction of motion of the carriage assembly 5.

Figure 5:
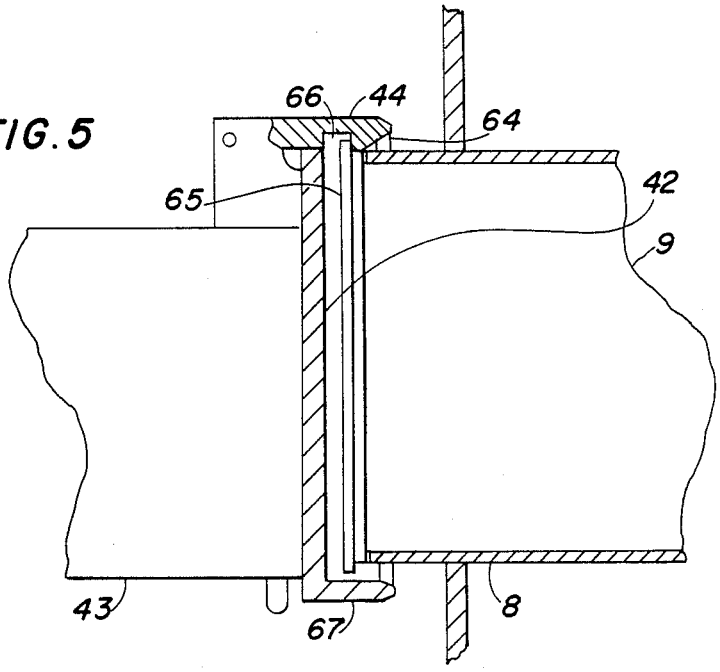
FIG. 5 a partial side view, partially cut away, showing the gripper latched to a round in the magazine.
Figure 7:
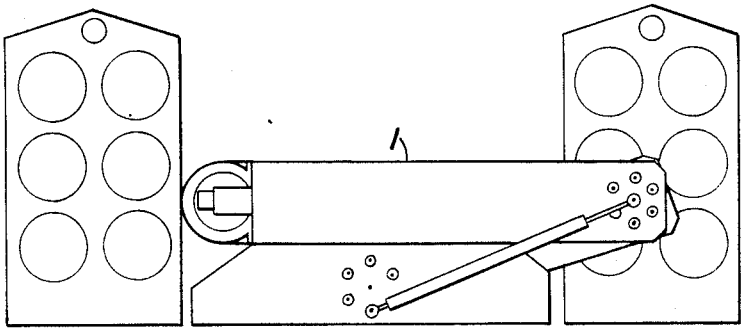
FIG. 7 is a rear view of the robotic autoloader and magazines shown in the home position.

Referring now to FIGS. 1, 2, 3, 4, 5, 6, and 7, the load cycle operation of the robotic autoloader is as follows: Starting with the carriage 5 in the ready position; that is, with the push rods 47 and 49 located between cams 54 and 55 as shown in FIG. 3, actuators 13 and 14 drive links 11 and 12 respectively to position the gripper assembly 42 in concentric alignment with a selected cavity 8 of the magazine 6 or 7. Carriage 5, beginning from the ready position, having been previously driven to said position in a manner leaving the latch 44 in the latched position, is driven to round 9 in cavity 8 of magazine 6, whereupon the sloping edge 64 of latch 44 rides over flange 65 on the base of round 9, capturing the flange 65 in notch 66 of latch 44, as shown in FIG. 5. Servomotor 34 then reverses the direction of motion of carriage 5, thereby extracting round 9 from cavity 8, in direction 61, the round 9 being guided and supported through the motion by guide tube 63, until carriage 5 reaches the end of travel, round 9 being fully withdrawn from and clear of magazine 6. Jointed link 3 then repositions load head 4 to the breech 10, such that the gripper assembly 42 is axially in line with the gun bore as shown in FIG. 1. Servomotor 34 then drives carriage 5 in direction 62 to high speed, accelerating round 9 until push rod 47 passes over cam 55 and lifts latch 44 thereby releasing round 9 and allowing said round 9 to continue into the gun breech 10 under the momentum imparted to it by said accelerating. Carriage assembly 5 is then decelerated by servomotor 34 to stop within the space between cam 55 and the front of the breech 10, whereupon the carriage 5 is driven back to the ready position, with push rod 49 passing over cam 54, releasing latch 44. The link 3 then returns to the home position as shown in FIG. 7, and the gun is ready to fire.

To perform a download, that is, to remove a round from the gun and return it to the magazine, jointed link 3 drives load head 4 to the gun breech 10 where the round 9 is extracted from the breech 10 in the same manner as the round 9 was extracted from the magazine 6, as heretofore described. Jointed link 3 then transports load head 4 to cavity 8 of magazine 6 where said round 9 is pushed slowly into said cavity 8 by the gripper assembly 42, latch 44 being lifted along the way as described above. Carriage assembly 5 then returns to the ready position, and the jointed link 3 retreats to the home position.

Thus there is provided a simple and versatile robotic autoloader for large caliber gun systems, which will selectively load and unload ammunition from fixed magazines.

While a specific embodiment of the invention has been shown and described in detail to illustrate the application of the principles of the invention, it will be understood that the invention may be embodied otherwise without departing from such principles.

What is claimed is:

1. An autoloader for loading and unloading rounds between a magazine having a plurality of cavities, each for receiving one round and the breech of a gun, comprising:

a base adapted to be positioned near the magazine;

a load head for receiving and discharging a round;

link means connected between said base and said load head for moving said load head between a position adjacent any one of the cavities, and a position adjacent the breech;

a carriage assembly mounted for movement to said load head, in a direction for extracting and replacing loads to and from the cavity and to and from the breech;

round gripping means connected to said carriage assembly for gripping a rear end of a round; and grip release means operatively connected to said round gripping means for selectively disconnecting a round from said round gripping means when the round is in the breech and in a cavity of the magazine.

2. An autoloader according to claim 1 wherein said link means comprises a pair of jointed links pivotally connected to said base, each jointed link being fixed to said load head, at least one actuator connected to said jointed links for pivoting said jointed links to move said load head from a position adjacent a cavity of a magazine to a position adjacent the breech, and at least one equilibrator connected between said base and at least one of said jointed links for counterbalancing the movement of said jointed links.

3. An autoloader according to claim 1 wherein said load head comprises a chassis fixed to said link means, at least one end plate fixed to said chassis and at least one shaft fixed to said end plate and extending in a direction substantially parallel to the cavities of the magazine, said carriage assembly being slidably mounted to said shaft for movement along said load head.

4. An autoloader according to claim 1 wherein said link means comprises at least one jointed link pivotally connected between said base and said load head for moving said load head between a position adjacent one cavity of one magazine and a position adjacent the breech, at least one shaft connected to said load head for slidably receiving said carriage assembly for movement of said carriage assembly along said load head, an actuator carried by said link and operatively connected to said carriage assembly for moving said carriage assembly along said shaft, said grip release means connected to said load head and engageable with said carriage assembly when said carriage assembly is moved on said load head to an end of the load head which is nearest the breech and magazines.

5. An autoloader according to claim 1 wherein said round gripping means comprises a grip cup shaped for receiving a rear end of a round, said grip cup being fixed to said carriage assembly for movement with said carriage assembly on said load head, a latch mounted for movement to said carriage assembly and with respect to said grip cup for engaging a rear end of a round for holding the round to the grip cup, said grip release means comprising a push rod slidably mounted to said carriage assembly and having an end engageable with said latch for moving said latch with movement of said push rod, said grip release means including at least one cam operatively connected to said load head for engagement with said push rod to move said push rod for releasing a round held by said latch.

6. An autoloader according to claim 5 wherein said latch is pivotally connected to said carriage assembly, a spring engaged with said latch for biasing said latch into a holding position for holding a round to said grip cup, a lock rod slidable mounted to said grip assembly adjacent said push rod, a second cam operatively connected to said load head for engaging said lock rod when said carriage head is at an end of said load head nearest the breech and magazines, and interlocking means connected between said push and lock rods for locking one of said push and lock rods when the other of said push and lock rods is free for sliding movement.

7. An autoloader according to claim 5 including a guide tube connected to said load head at an end of said load head nearest the breech and magazines, for guiding a round as it moves with said carriage assembly.

8. A robotic autoloader for loading and unloading rounds having rear ends with flanges between multiple cavities of at least one magazine and a breech of a gun, comprising:

a base adapted to be mounted near the magazine and breech;

a pair of spaced apart jointed links each having a lower link pivotally mounted to said base and an upper link pivotally mounted to said lower link;

drive means for individually driving said upper and lower links from a lower storage position adjacent said base to a plurality of upper extended positions with said upper links being adjacent the breech and any one of the cavities;

at least one equilibrator connected between said base and at least one of said links for counterbalancing the movement of said links;

a load head fixed to each of said upper links and extending substantially parallel to an extraction direction for removing rounds from the cavities;

a pair of parallel shafts fixed to said load head;

a carriage assembly mounted for sliding movement on said parallel shafts in the extraction direction;

further drive means connected to said carriage assembly for moving said carriage assembly along said parallel shafts;

a gripper assembly connected to said carriage assembly on an end of said carriage assembly closest to the breech and magazine, said gripper assembly comprising a grip cup for receiving the rear end of round, and a latch pivotally mounted to said grip cup and having a recess for engaging the flange of a round to hold the round to the grip cup; and grip release means connected to said gripper assembly for moving said latch, said grip release means including at least one part connected at a fixed location to said load head at an end of said load head near the breech and magazine, for releasing said latch when said carriage assembly has moved on said load head to the end which is near the gun and magazine.

9. A robotic autoloader according to claim 8 wherein said grip release means comprises an unlatching push rod slidably mounted to said grip assembly for pivoting said latch, a locking push rod slidably mounted to said gripper assembly adjacent to said unlatching push rod and lock means operatively interconnected between said push rods for locking the movement of one push rod when the other push rod is free to move, said grip release means including a cam pivotally mounted to said load head for each of said push rods, each cam being positioned at a different location in the direction of movement of said carriage assembly on said load head for moving said unlatching and locking push rods at different times during the movement of said carriage assembly.

* * * * *